United States Patent
Gunawardena et al.

(10) Patent No.: US 9,124,356 B2
(45) Date of Patent: Sep. 1, 2015

(54) RECONFIGURABLE CORRELATOR FOR A NAVIGATION SYSTEM

(71) Applicants: Sanjeev Gunawardena, Athens, OH (US); Jeff Dickman, Thousand Oaks, CA (US); Mathew A Cosgrove, Woodland Hills, CA (US)

(72) Inventors: Sanjeev Gunawardena, Athens, OH (US); Jeff Dickman, Thousand Oaks, CA (US); Mathew A Cosgrove, Woodland Hills, CA (US)

(73) Assignee: NORTHROP GRUMMAN GUIDANCE AND ELECTRONICS COMPANY, INC., Woodland Hills, CA (US)

(*) Notice: Subject to any disclaimer, the term of this patent is extended or adjusted under 35 U.S.C. 154(b) by 70 days.

(21) Appl. No.: 13/713,817

(22) Filed: Dec. 13, 2012

(65) Prior Publication Data

US 2013/0156073 A1    Jun. 20, 2013

Related U.S. Application Data

(60) Provisional application No. 61/570,562, filed on Dec. 14, 2011.

(51) Int. Cl.
*H04B 1/00* (2006.01)
*H04B 1/709* (2011.01)
*G01S 19/30* (2010.01)
*G01S 19/21* (2010.01)

(52) U.S. Cl.
CPC .............. *H04B 1/709* (2013.01); *G01S 19/30* (2013.01); *G01S 19/21* (2013.01)

(58) Field of Classification Search
None
See application file for complete search history.

(56) References Cited

U.S. PATENT DOCUMENTS

| | | | |
|---|---|---|---|
| 7,852,907 B2 | 12/2010 | Eerola | |
| 2004/0202235 A1* | 10/2004 | Kohli et al. | 375/150 |
| 2011/0261805 A1* | 10/2011 | Landry et al. | 370/342 |

OTHER PUBLICATIONS

Hurskainen, et al.: *"Multicore Software-Defined Radio Architecture for GNSS Receiver Signal Processing"*; Hindawi Publishing Corporation, EURASIP Journal on Embedded Systems, vol. 2009, Article ID 543720, 10 pages, doi:10.1155/2009543720.

* cited by examiner

*Primary Examiner* — Adolf Dsouza
(74) *Attorney, Agent, or Firm* — Tarolli, Sundheim, Covell & Tummino LLP (57) ABSTRACT

Systems and methods are provided for a correlator system. The system includes a plurality of numerically controlled oscillators and a multiplier configured to receive an input stream representing a received signal. A carrier multiplexer is configured to select between respective outputs of at least two of the plurality of numerically controlled oscillators and provide the selected output to the multiplier. A code generator is configured to provide a replica code. A delay component is configured to provide a delayed code from the replica code. A code multiplexer is configured to selectively provide each of the delayed code and the replica code to the multiplier.

15 Claims, 4 Drawing Sheets

RECONFIGURABLE CORRELATOR FOR A NAVIGATION SYSTEM

RELATED APPLICATIONS

This application claims priority from U.S. Provisional Patent Application Ser. No. 61/570,562, filed 14 Dec. 2011, which is incorporated herein in its entirety.

TECHNICAL FIELD

This invention relates to navigation systems, and more particularly, to a reconfigurable correlator for a navigation system.

BACKGROUND OF THE INVENTION

The fundamental baseband digital signal-processing component used in a global navigation satellite system (GNSS) receiver is known as a correlator. It correlates digitized samples of a received GNSS signal output by an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received signal parameters whose power level can be well below that of thermal noise. Fundamentally, these received signal parameters are the magnitude of the despread signal and phase of its carrier with respect to the locally generated carrier.

SUMMARY OF THE INVENTION

In accordance with an aspect of the present invention, a correlator system includes a plurality of numerically controlled oscillators and a multiplier configured to receive an input stream representing a received signal. A carrier multiplexer is configured to select between respective outputs of at least two of the plurality of numerically controlled oscillators and provide the selected output to the multiplier. A code generator is configured to provide a replica code. A delay component is configured to provide a delayed code from the replica code. A code multiplexer is configured to selectively provide each of the delayed code and the replica code to the multiplier.

In accordance with another aspect of the present invention, a method is provided. For each of the plurality of correlators, a code is selected from a plurality of provided codes at a first set of associated multiplexers. For each of a subset of the plurality of correlators, a carrier is selected from a plurality of provided carriers at a first set of associated multiplexers. For each of the subset of the plurality of correlators, the selected carrier and the selected code are combined to provide a replica signal for the correlator.

In accordance with still another aspect of the present invention, another method is provided. An early global navigation satellite system (GNSS) replica code, a prompt GNSS replica code generated as a delayed version of the early GNSS replica code, a late GNSS replica code generated as a first delayed version of the prompt GNSS replica code, and a flanking GNSS replica code generated as a second delayed version of prompt GNSS replica code having a delay greater than that of the late GNSS replica code are generated. A first carrier signal having a first frequency is generated. An early minus late code representing a difference between the early GNSS replica code and the late GNSS replica code is generated. The early GNSS replica code is selected at a first multiplexer receiving at least the early GNSS replica code and the prompt GNSS code as inputs. The prompt GNSS replica code is selected at a second multiplexer receiving at least the prompt GNSS replica code and the early minus late code as inputs. The late GNSS replica code is selected at a third multiplexer receiving at least the late GNSS replica code and the flanking GNSS replica code as inputs. Each of the early GNSS replica code, the prompt GNSS replica code, and the late GNSS replica code are combined with the first carrier signal to provide early, prompt, and late replica signals at respective first, second, and third correlators.

DETAILED DESCRIPTION

The present invention relates generally to navigation systems and can be implemented within any appropriate navigation system that relies on signal dispreading. For the purpose of example, the foregoing description is drawn specifically to implementations of GNSS receivers, but it will be appreciated that the invention is generally applicable to any spread spectrum system. The fundamental baseband digital signal processing component used in a GNSS receiver is known as a correlation engine, or correlator. A correlation engine correlates digitized samples of a received GNSS signal output by an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received GPS signal parameters whose power level can be well below that of thermal noise. These received signal parameters represent the magnitude of the de-spread signal, and the phase of its carrier with respect to the locally-generated carrier.

The correlation occurs at the sample rate of the ADC, which is proportional to the designed bandwidth of the receiver front-end. Typically, sample rates can range between four megahertz to hundreds of megahertz, depending on the design of the front-end. This sample rate is typically too high to use anything other than custom digital hardware to perform the correlation operation in real time. During the normal operation of a GNSS receiver, the receiver is configured to dynamically adapt to varying operational conditions, with the goal of producing the best range measurements possible, that is, range measurements with the lowest possible measurement error and noise. In some implementations, as part of this process the total time necessary to perform the correlation, referred to as pre-detection integration time, is varied, typically in integer millisecond steps.

In one implementation, the GPS receiver algorithms are partitioned between hardware and software running on a microprocessor. The correlation is performed for up to one-millisecond in hardware and the results are transferred to a software processor, where further integration may be performed. The software can control the replica carrier and code generators resident in the digital hardware at one-millisecond epochs. Accordingly, bidirectional communication is maintained between the hardware correlators and the software, and in one implementation, this communication occurs continuously at a rate of up to one kilohertz.

In accordance with an aspect of the present invention, the hardware correlators can be configurable to perform multiple functions. In one implementation, a given correlator can, in a first mode of operation, provide an "early" correlation result, a "prompt" correlation result, representing a first delay from the early correlation result, and a "late" correlation result, representing a second delay from the early correlation result. When a different mode of operation is desired, the correlator can be dynamically reconfigured such that one or more of the correlation results can represent either a discrete Fourier transform at a particular frequency, or a correlation result associated with an extraneous signal (e.g., a spoofed signal, a multipath reflection, or side lobe peak in a Binary Offset Carrier (BOC) system). Accordingly, a correlator in accordance with an aspect of the present invention allows for a significant increase in flexibility over existing systems.

Figure 1:
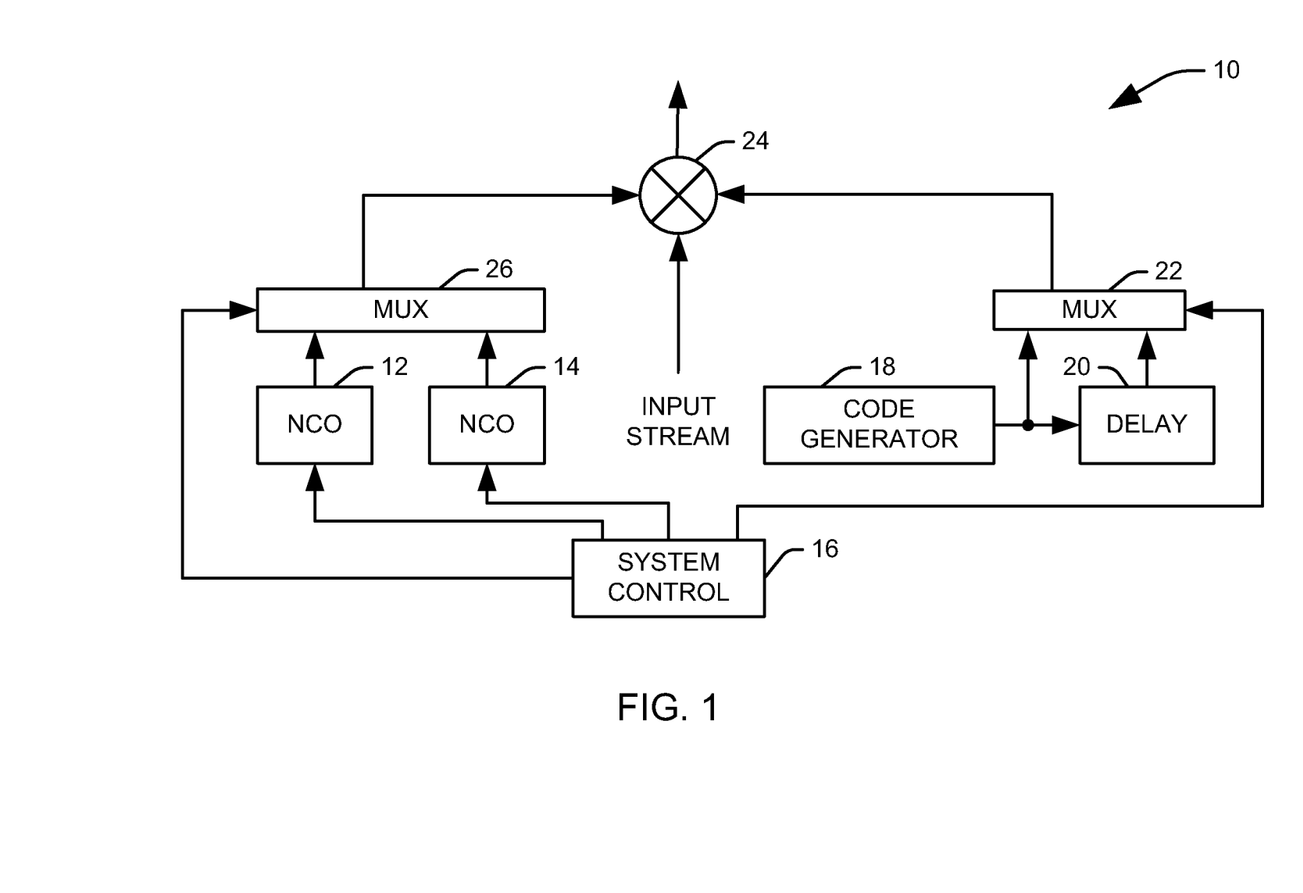
FIG. 1 illustrates a correlator system for a global navigation satellite system (GNSS) in accordance with an aspect of the present invention.

FIG. 1 illustrates a correlator system 10 for a global navigation satellite system (GNSS) in accordance with an aspect of the present invention. The correlator system 10 includes a plurality of numerically controlled oscillators 12 and 14, each configured to provide a replica carrier signal representing a carrier signal expected to be received from a satellite in the GNSS system. It will be appreciated that, in accordance with an aspect of the present invention, an associated frequency of each numerically controlled oscillator 12 and 14 can be configured at a system control 16. For example, the system control 16 can be implemented as software stored on one or more non-transitory computer readable medium and one or more associated processors.

A code generator 18 provides a replica GNSS code representing a pseudorandom code expected to be received from a satellite in the GNSS system. The replica code is provided to a delay component 20 that produces a delayed representation of the replica code. Each of the replica code and the delayed version of the replica code are provided to a code multiplexer 22. The code multiplexer 22 is controlled by the system control 16 to select from at least the replica code and its delayed representation and provide the selected code to a multiplier 24.

A carrier multiplexer 26 is controlled by the system control 16 to select between respective outputs of at least two of the plurality of numerically controlled oscillators 12 and 14 and provide the selected output to the multiplier 24. The multiplier 24 also receives a digitized input stream from a signal received at an associated analog-to-digital converter (ADC). The resulting multiplication of the replica carrier selected at the carrier multiplexer 26, the replica code selected at the code multiplexer 22, and the input stream provides a correlation result representing a similarity between the selected replica code and a code represented by the digitized input stream. This correlation result can be provided to the system control 16 or another microprocessor for analysis to track the received GNSS signal.

In accordance with an aspect of the present invention, the code multiplexer 22 can be used to select among representations of the replica code at different delays to provide correlation results for early, prompt, late, and flanking representations of the replica code. Accordingly, each multiplier 24 within the system can be configured to switch dynamically among different functions within the correlator system 10. In one implementation, the code multiplexer 22 is further configured to selectively provide code consisting of a constant value (e.g., "1" instead of a pseudorandom sequence of "1" and "−1" values), such that when code consisting of the constant value is provided, the multiplier 24 combines the selected output from the carrier multiplexer 26, the code consisting of the constant value, and the input stream to provide an output representing a discrete Fourier transform at a frequency represented by the selected output from the carrier multiplexer. Since both the code multiplexer 22 and the frequency of a given numerically controlled oscillator 12 and 14 are controllable by the system control 16, some or all of the correlator resources can be dynamically reassigned between spectral monitoring of the received signal and generation of a correlation result for the received GNSS code.

Figure 2:
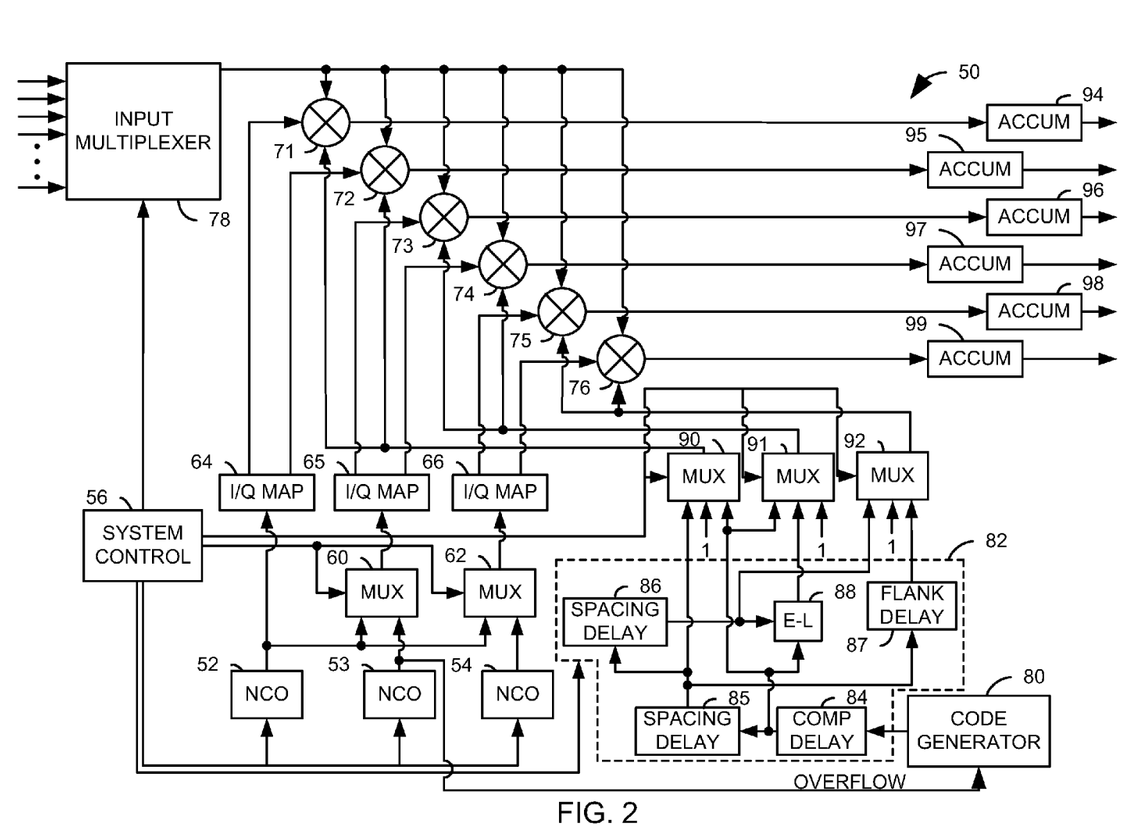
FIG. 2 illustrates one implementation of a correlator assembly in accordance with an aspect of the present invention.

FIG. 2 illustrates one implementation of a correlator assembly 50 in accordance with an aspect of the present invention. The correlator assembly 50 includes first, second, and third numerically controlled oscillators (NCOs) 52-54 each configured to provide replicas of carrier signal at a desired frequency. It will be appreciated that a specific frequency of operation of each numerically controlled oscillator 52-54 can be controlled by a system control 56.

An output of the first numerically controlled oscillator 52 is provided as a first input to each of first and second carrier multiplexers 60 and 62. An output of the second numerically controlled oscillator 53 is provided as a second input to the first carrier multiplexer 60. An output of the third numerically controlled oscillator 54 is provided as a second input to the second carrier multiplexer 62. Each of the carrier multiplexers 60 and 62 is controlled by the system control 56 to selectively output either the output of the first numerically controlled oscillator 52 or its associated other of the numerically controlled oscillators.

The output of the first numerically controlled oscillator 52 is also provided to a first I/Q mapping component 64, which maps the replica carrier signal provided by the first numerically controlled oscillator into in-phase and quadrature components. The in-phase component is provided as a first input to a first multiplier 71, and the quadrature component is provided as a first input to a second multiplier 72. The output of the first carrier multiplexer 60 is provided to a second I/Q mapping component 65, which maps the replica carrier signal selected at the first carrier multiplier into an in-phase component, provided as a first input to a third multiplier 73 and a quadrature component, provided as a first input to a fourth multiplier 74. The output of the second carrier multiplexer 62 is provided to a third I/Q mapping component 66, which maps the replica carrier signal selected at the second carrier multiplier into an in-phase component, provided as a first input to a fifth multiplier 75 and a quadrature component, provided as a first input to a sixth multiplier 76.

An input multiplexer 78 selects one of a plurality of input streams from an associated analog front end analog-to-digital converter (ADC) (not shown). The selected input stream is provided to each of the plurality of multipliers 71-76 as a second input. A code generator 80 generates a GNSS replica code, and provides the replica code to a delay assembly 82. In the illustrated implementation, the code generator 80 can be clocked by an overflow output of one of the numerically controlled oscillators 52-54. In the illustrated implementation, the code generator is clocked only from the output of the second numerically controlled oscillator 53. The replica code can be represented as a series of samples with values of 1 or −1. The delay assembly 82 includes a compensatory delay component 84 that corrects for delays that occur in the signal path from the ADC. For example, the compensatory delay component 84 can direct for delays induced via digital filtering of the input stream. The output of the compensatory delay component 84 represents an "early" code relative to the input stream, such that it precedes the expected arrival of the corresponding GNSS code in the input stream by a first delay.

The delay assembly 82 further includes a first spacing delay component 85. The first spacing delay component 85 applies a delay equal to the first delay to provide a GNSS replica code expected to correspond to the GNSS code arriving in the input stream. This code is referred to as the "prompt" code. The prompt code is provided to each of a second spacing delay component 86, configured to provide a second delay to the prompt code to produce a "late" code and a flank delay component 87 configured to provide a third delay to the prompt code to produce a "flanking" code. The late code is delayed to trail the expected arrival of the corresponding GNSS code in the input stream by the second delay, and the flanking code is delayed to a time associated with another code in the input stream, such as a spoofed signal, a multipath reflection, or secondary correlation peak (e.g., BOC). In general, the first delay and the second delay will be equal and the third delay will be longer than either of the first and second delays. Each of the delay components 84-87 can be responsive to the system control 56 for dynamic configuration of the compensatory delay and the first, second, and third delays.

Each of the early code from the compensatory delay component 84 and the prompt code from the first spacing delay 85 are provided to a first code multiplexer 90 that selects either the early code, the prompt code, or a constant value of 1 to provide to the first and second multipliers 71 and 72 as third inputs. The late code from the second spacing delay component 86 and the early code are provided to early minus late logic 88 that produces a composite code representing a difference between the early code and the late code. This composite code and the prompt code are provided to a second code multiplexer 91 that selects either the early minus late composite code, the prompt code, or a constant value of 1 to provide to the third and fourth multipliers 73 and 74 as third inputs. The late code and the flanking code from the flank delay component 87 are provided to a third code multiplexer 92 that selects either the late code, the flanking code, or a constant value of 1 to provide to the fifth and sixth multipliers 75 and 76 as third inputs. It will be appreciated that each of the code multiplexers 90-92 can be controlled by the system control 56 to allow for dynamic selection of desired replica codes.

The output of each multiplier 71-76 is provided to a corresponding accumulator 94-99. Each accumulator 94-99 accumulates the product of the input stream and the replica code represented by the selected carrier and code provided to the multiplier and stores the accumulated value in an associated register. These registers can be read by a microprocessor (not shown) as correlation data characterizing the input stream. It will be appreciated that the six accumulators 94-99 represent three in-phase/quadrature pairs, and to simplify the foregoing explanation of the operation of the system, thus a first pair of accumulators 94 and 95 will be referred to hereinafter as a first accumulator assembly, a second pair of accumulators 96 and 97 will be referred as a second accumulator assembly, and a third pair of accumulators 98 and 99 will be referred as a third accumulator assembly.

In accordance with an aspect of the present invention, the system 50 can be configured to operate in one of four modes. In a first mode, the system 50 operates as a three complex point discrete Fourier transform (DFT), with each complex point provided by one of the accumulator assemblies. Each of the numerically controlled oscillators 52-54 provides a carrier at a desired frequency, and the carrier multiplexers 60 and 62 are configured to select the outputs of the second and third numerically controlled oscillators 53 and 54. It will be appreciated that the specific frequencies of the carriers produced at the numerically controlled oscillators 52-54 can be selected at the system control 56, for example, by a software program for performing and evaluating the three complex point Fourier transform. The code multiplexers 90-92 are configured in this mode such that they each provide a constant value of 1. Accordingly, the correlator system 50 is configured to performing the three complex point discrete Fourier transform on the input sample stream with each of the three complex points independently controlled by the system control. This mode of operation can be used for spectral monitoring.

In a second mode, the correlator system 50 operates as a traditional early-prompt-late correlator. In this mode, the carrier multiplexers 60 and 62 are configured to select the outputs of the first numerically controlled oscillator 52, such that all six multipliers 71-76 receive the output of the I/Q map from the first numerically controlled oscillator. The second numerically controlled oscillator 53 is used solely to steer the code, and the third numerically controlled oscillator 54 is not used. The first code multiplexer 90 is configured to provide the early code, the second code multiplexer 91 is configured to provide the prompt code, and the third code multiplexer 92 is configured to provide the late code. Accordingly, the first accumulator assembly provides an early correlation result, the second accumulator assembly provides a prompt correlation result, and the third accumulator assembly provides the late correlation result.

In a third mode, the correlator system 50 operates as a correlator with a low power spectral monitoring function. In this mode, the first carrier multiplexer 60 is configured to select the output of the first numerically controlled oscillator 52, and the second carrier multiplier 62 is configured to select the output of the third numerically controlled oscillator 54. The first code multiplexer 90 is configured to provide the prompt code, the second code multiplexer 91 is configured to provide the early minus late composite code, and the third code multiplexer 92 is configured to provide a constant value of 1. Accordingly, the first accumulator assembly provides the prompt correlation result, the second accumulator assembly provides an early minus late correlation result that can be used for steering the code, and the third accumulator assembly provides the results of a single point discrete Fourier transform that can be controlled independently of the replica carrier and code by the system control 56.

In a fourth mode, the correlator system 50 operates as a correlator with a flanking function. In this mode, the carrier multiplexers 60 and 62 are configured to select the outputs of the first numerically controlled oscillator 52, such that all six multipliers 71-76 receive the output of the first numerically controlled oscillator. The first code multiplexer 90 is configured to provide the prompt code, the second code multiplexer 91 is configured to provide the early minus late composite code, and the third code multiplexer 92 is configured to provide the flanking code. Accordingly, the first accumulator assembly provides the prompt correlation result, the second accumulator assembly provides an early minus late correlation result that can be used for steering the code, and the third accumulator assembly provides a correlation result for a still further delayed version of the code, the spacing of which can be controlled independently of the replica carrier and code by the system control 56. This flanking correlation result can be used to detect multipath reflections, spoofed GNSS signals, or monitoring ambiguous correlation peaks in a binary offset carrier system. For example, correlation peak crossings outside of an expected delay can be recorded as the flank delay 87 is swept repeatedly through a range of values. These values can be analyzed to identify persistent correlation peaks representing anomalous signals. When such a signal is located, an operator can be alerted, and appropriate measures can be taken to compensate for the anomalous signal.

Figure 3:
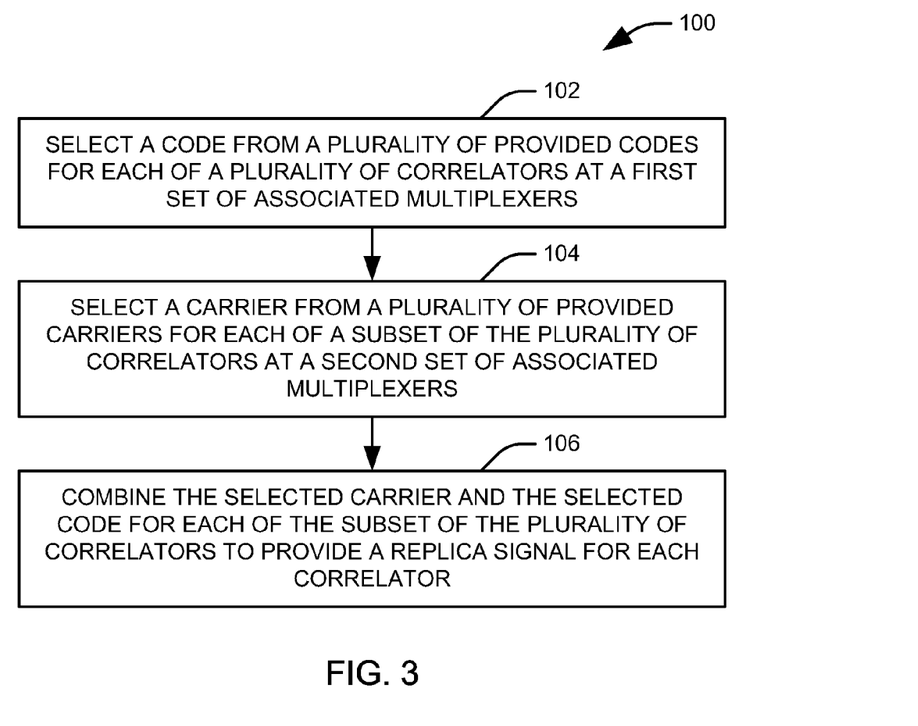
FIG. 3 illustrates a method for operating a reconfigurable correlator assembly in accordance with an aspect of the present invention.
Figure 4:
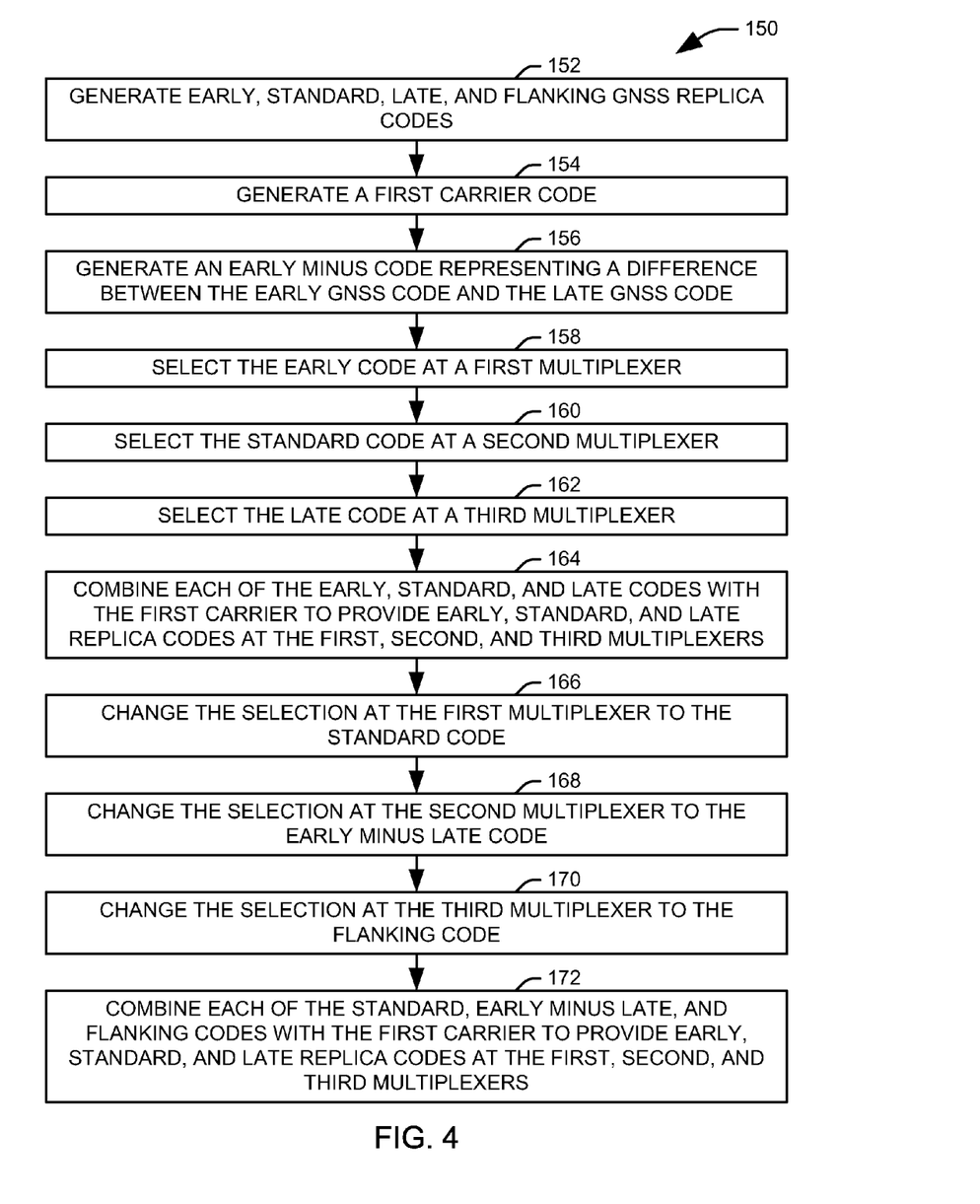
FIG. 4 illustrates another method for operating a reconfigurable correlator assembly in accordance with an aspect of the present invention.

In view of the foregoing structural and functional features described above, methodologies in accordance with various aspects of the present invention will be better appreciated with reference to FIGS. 3 and 4. While, for purposes of simplicity of explanation, the methodologies of FIGS. 3 and 4 is shown and described as executing serially, it is to be understood and appreciated that the present invention is not limited by the illustrated order, as some aspects could, in accordance with the present invention, occur in different orders and/or concurrently with other aspects from that shown and described.

FIG. 3 illustrates a method 100 for operating a reconfigurable correlator assembly in accordance with an aspect of the present invention. At 102, a code from a plurality of provided codes is selected for each of a plurality of correlators at a first set of associated multiplexers. For one correlator, for example, the provided codes can include a GNSS replica code, a binary code consisting of a repeated, constant value, and a delayed representation of a GNSS replica code. The code consisting of a repeated, constant value can be used, for example, to implement a single point discrete Fourier transform. In another example, the codes provided for a given correlator may include the GNSS replica code, the binary code, and an early minus late code representing a difference between the GNSS replica code and a delayed version of the GNSS replica code. In one example, the provided codes for a first correlator of the plurality of correlators includes the GNSS replica code, an early version of the GNSS replica code having less delay, and the binary code.

At 104, a carrier from a plurality of provided carriers is selected for each of a subset of the plurality of correlators at a second set of associated multiplexers. In one implementation, the subset includes all correlators but the first, and the first correlator utilizes a first carrier, having a first associated frequency. Each of the subset of the plurality of correlators select between the first carrier and another carrier, having a frequency different than that of the first carrier. For example, a second correlator of the plurality of correlators might utilize one of the first carrier and a second carrier, having a second frequency, while the third correlator might utilize one of the first carrier and a third carrier, having a third frequency. In one implementation, each of the provided carriers are generated at an associated numerically controlled oscillator, with a frequency for each of the provided carriers selected at a system control At 106, the selected carrier and the selected code for each of the correlators are combined to provide a replica signal for the correlator. It will be appreciated that, in some implementations, one or more of the plurality of carriers may utilize a single default carrier, and thus the selected carrier will be the default carrier. In accordance with an aspect of the present invention, however, at least a nontrivial subset of the plurality of correlators will select among multiple provided carriers. In one implementation, the replica signal for each correlator is generated at the same time as the replica signal is utilized to evaluate a provided input stream, such that the combination of the selected carrier and the selected code for each of the subset of the plurality of correlators includes combining the selected carrier, the selected code, and an input stream from an associated front end analog-to-digital converter (ADC). The correlation result provided from this combination can be accumulated for later analysis.

FIG. 4 illustrates another method 150 for operating a reconfigurable correlator assembly in accordance with an aspect of the present invention. At 152, each of an early global navigation satellite system (GNSS) replica code, a prompt GNSS replica code representing a delayed version of the early GNSS replica code, a late GNSS replica code representing a first delayed version of the prompt GNSS replica code, and a flanking GNSS replica code representing a second delayed version of prompt GNSS replica code having a delay greater than that of the late GNSS replica code are generated. At 154, a first carrier signal having a first frequency is generated. At 156, an early minus late code representing a difference between the early GNSS replica code and the late GNSS replica code is generated.

At 158, the early GNSS replica code is selected at a first multiplexer receiving at least the early GNSS replica code and the prompt GNSS code as inputs. At 160, the prompt GNSS replica code is selected at a second multiplexer receiving at least the prompt GNSS replica code and the early minus late code as inputs. At 162, the late GNSS replica code is selected at a third multiplexer receiving at least the late GNSS replica code, and the flanking GNSS replica code as inputs. At 164, each of the early GNSS replica code, the prompt GNSS replica code, and the late GNSS replica code are combined with the first carrier signal to provide early, prompt, and late replica signals at respective first, second, and third correlators.

In accordance with an aspect of the present invention, the correlator system can be reconfigured to operate in a different mode. To this end, at 166 the selection at the first multiplexer from the early GNSS replica code to the prompt GNSS replica code. At 168, the selection at the second multiplexer is changed from the prompt GNSS replica code to the early minus plus code. At 170, the selection at the third multiplexer is changed from the late GNSS replica code to the flanking code. At 172, each of the prompt GNSS replica code, the early minus late code, and the flanking code are combined with the first carrier signal to provide respective prompt, early minus late, and flanking replica signals at the first, second, and third correlators.

It will be appreciated that the correlator system can be adapted to other modes of operation as well. In one implementation, a binary code consisting of a repeated constant value is generated, along with second and third carrier signals having respective second and third frequencies. This binary signal is provided as an additional input to each of the first, second, and third multiplexers, and the binary signal is selected at each of the multiplexers. Each of the first, second, and third carrier signals are then combined with the binary code to provide a three-point discrete Fourier transform (DFT), with each point provided by one of the first, second, and third correlators.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A correlator system comprising:
a plurality of numerically controlled oscillators configured to produce respective replica carrier signals;
a carrier multiplexer configured to select between respective replica carrier signals produced by at least two of the plurality of numerically controlled oscillators;
a code generator configured to provide a replica code;
a delay component configured to provide a delayed code from the replica code;
a code multiplexer configured to selectively provide one of the delayed code and the replica code to a multiplier, the multiplier being configured to further receive an input stream representing a received signal and a replica carrier signal selected at the carrier multiplexer and provide a correlation result representing a similarity of the provided code to a code associated with the received input stream; and
a system control that controls each of the carrier multiplexer and the code multiplexer to select a mode of operation of the correlator system from a plurality of available modes of operation, the plurality of modes of operation comprising a traditional correlator mode, a correlator mode with a low power spectral monitoring function, a correlator mode with a flanking function, and a spectral monitoring mode, in which the correlator system provides a three complex point discrete Fourier transform.

2. The correlator system of claim 1, the system control being configured to control the plurality of numerically controlled oscillators as to configure an associated frequency for each of the replica carrier signals.

3. The correlator system of claim 1, wherein the delay component is a first delay component, and the delayed code is a first delayed code, the system further comprising a second delay component configured to provide a second delayed code from the first delayed code.

4. The correlator system of claim 3, further comprising a third delay component configured to provide a third delayed code in a flanking configuration from the first delayed code.

5. The correlator system of claim 3, further comprising digital logic configured to produce a composite code representing a difference between the replica code and the second delayed code, wherein the code multiplexer comprises a first code multiplexer of a plurality of code multiplexers, the multiplier comprises a first multiplier of a plurality of multipliers, each associated with one of the plurality of code multiplexers, and the first multiplier receives the replica code, the second multiplier receives the composite code, and the third multiplier receives one of a further delayed replica code and a constant binary code such that the output of the third multiplier can be used for one of a flanking code and a single point discrete Fourier transform.

6. A method comprising:
selecting a mode of operation of a correlator system from a plurality of available modes of operation;
selecting, for each of a plurality of correlators, a code from a plurality of provided codes at a first set of multiplexers, wherein a given correlator of the plurality of correlators is configured to receive the selected one of the plurality of provided codes, and wherein, in a given mode the provided codes include a GNSS replica code and an early minus late code representing a difference between the GNSS replica code and a delayed version of the GNSS replica code from an associated multiplexer of the first set of multiplexers, and in another mode, a code consisting of the constant value is provided such that one or more of the correlation results can represent either a discrete Fourier transform at a particular frequency or a correlation result associated with an extraneous signal;
selecting, for each of a subset of the plurality of correlators, a carrier from a plurality of provided carriers at a second set of associated multiplexers; and
combining, for each of the subset of the plurality of correlators, the selected carrier and the selected code to provide a replica signal for the correlator;
wherein the above method is implemented by one or more processors.

7. The method of claim 6, further the plurality of correlators comprising a first correlator and the subset of the plurality of correlators comprising at least a second correlator, the method further comprising combining the selected code for the first correlator with the first carrier to provide a replica signal for the first correlator.

8. The method of claim 7, wherein selecting, for each of the subset of the plurality of correlators, a carrier from a plurality of provided carriers comprises selecting between the first carrier signal and another carrier signal, having a frequency different than the first frequency.

9. The method of claim 7, wherein selecting among a plurality of provided codes for the given correlator comprises selecting between at least the GNSS replica code, an early version of the GNSS replica code having less delay, and the binary code consisting of a repeated constant value.

10. The method of claim 6, each of the plurality of provided carriers being generated at an associated numerically controlled oscillator, the method further comprising configuring a frequency for each of the provided carriers at a system control.

11. A method comprising:
generating an early global navigation satellite system (GNSS) replica code, a prompt GNSS replica code generated as a delayed version of the early GNSS replica code, a late GNSS replica code generated as a first delayed version of the prompt GNSS replica code, and a flanking GNSS replica code generated as a second delayed version of prompt GNSS replica code having a delay greater than that of the late GNSS replica code;
generating a first carrier signal having a first frequency;
generating an early minus late code representing a difference between the early GNSS replica code and the late GNSS replica code;
selecting the early GNSS replica code at a first multiplexer receiving at least the early GNSS replica code and the prompt GNSS code as inputs;
selecting the prompt GNSS replica code at a second multiplexer receiving at least the prompt GNSS replica code and the early minus late code as inputs;
selecting the late GNSS replica code at a third multiplexer receiving at least the late GNSS replica code, and the flanking GNSS replica code as inputs; and
combining each of the early GNSS replica code, the prompt GNSS replica code, and the late GNSS replica code with the first carrier signal to provide early, prompt, and late replica signals at respective first, second, and third correlators.

12. The method of claim 11, further comprising:
changing the selection at the first multiplexer from the early GNSS replica code to the prompt GNSS replica code;

changing the selection at the second multiplexer from the prompt GNSS replica code to the early minus late code;
changing the selection at the third multiplexer from the late GNSS replica code to the flanking code; and
combining each of the prompt GNSS replica code, the early minus late code, and the flanking code with the first carrier signal to provide respective prompt, early minus late, and flanking replica signals at the first, second, and third correlators;
wherein the above method is implemented by one or more processors.

13. The method of claim 11, further comprising:
generating a binary code consisting of a repeated constant value;
generating second and third carrier signals having respective second and third frequencies;
providing the binary code as an input to each of the first, second, and third multiplexers;
selecting the binary code at each of the first, second, and third multiplexers; and
combining each of the first, second, and third carrier signals with the binary code to provide a three complex point discrete Fourier transform (DFT), with each point provided by one of the first, second, and third correlators.

14. The method of claim 11, further comprising:
generating a binary code consisting of a repeated constant value;
generating a second carrier signals having a second frequency;
changing the selection at the first multiplexer from the early GNSS replica code to the prompt GNSS replica code;
changing the selection at the second multiplexer from the prompt GNSS replica code to the early minus late code;
changing the selection at the third multiplexer from the late GNSS replica code to the binary code;
combining each of the prompt GNSS replica code and the early minus late code with the first carrier signal to provide respective prompt and early minus late replica signals at the first and second correlators; and
combining the second carrier signal with the binary code to provide a single point discrete Fourier transform (DFT) at the third correlator.

15. A correlator system comprising:
a plurality of numerically controlled oscillators configured to produce respective replica carrier signals;
a carrier multiplexer configured to select between respective replica carrier signals produced by at least two of the plurality of numerically controlled oscillators;
a code generator configured to provide a replica code;
a delay component configured to provide a delayed code from the replica code;
a code multiplexer configured to selectively provide one of the delayed code and the replica code to a multiplier, the multiplier being configured to further receive an input stream representing a received signal and a replica carrier signal selected at the carrier multiplexer and provide a correlation result representing a similarity of the provided code to a code associated with the received input stream, and further configured to selectively provide a code consisting of a constant value, such that when code consisting of the constant value is provided, the multiplier combines the selected replica carrier signal from the carrier multiplexer, the code consisting of the constant value, and the input stream, to provide an output representing a discrete Fourier transform at a frequency represented by the selected output from the carrier multiplexer.

* * * * *